UNITED STATES PATENT OFFICE.

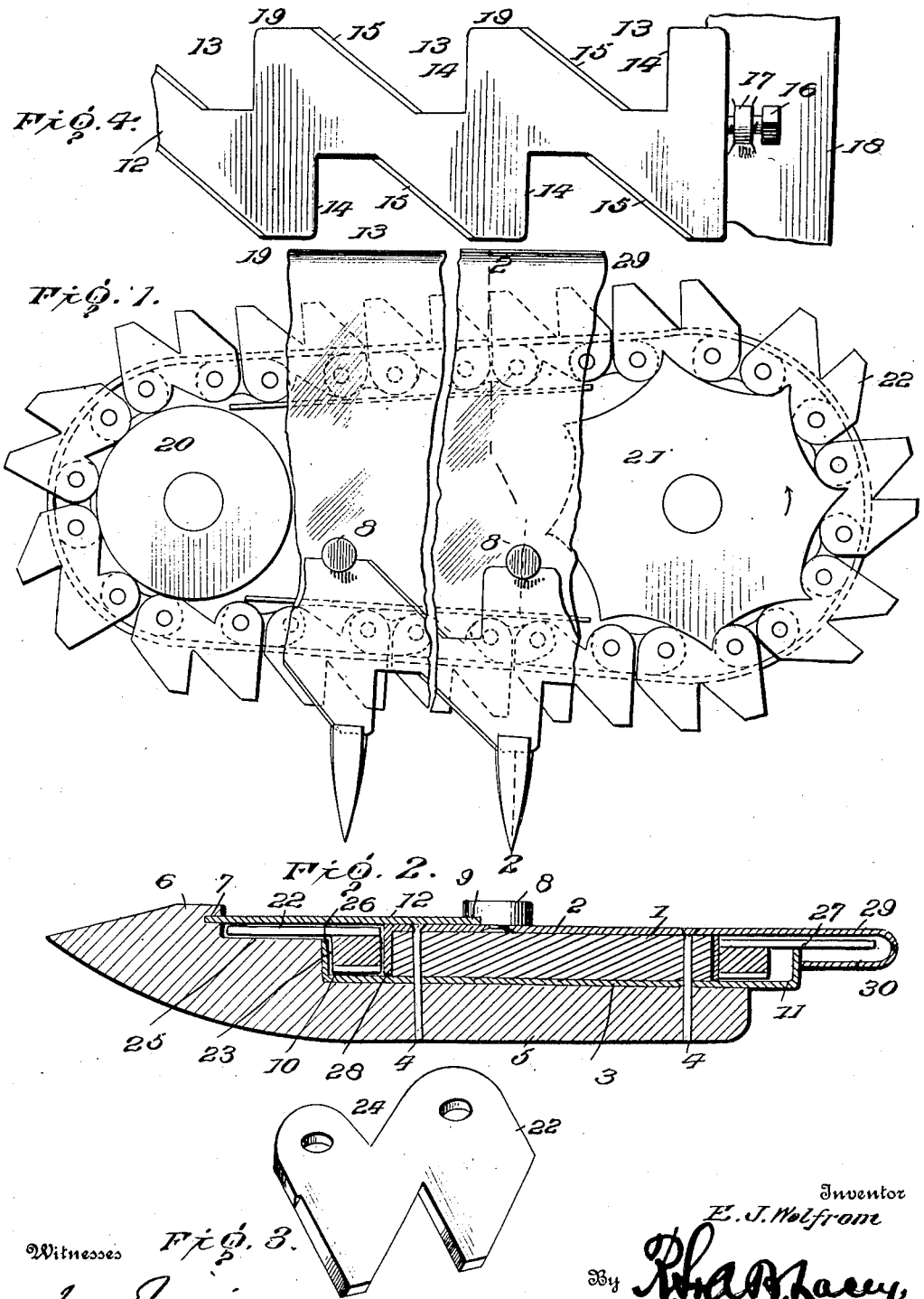

ELI J. WOLFROM, OF SALIDA, COLORADO.

CUTTER-BAR.

No. 875,878.   Specification of Letters Patent.   Patented Jan. 7, 1908.

Application filed February 6, 1907. Serial No. 356,103.

*To all whom it may concern:*

Be it known that I, ELI J. WOLFROM, a citizen of the United States, residing at Salida, in the county of Chaffee and State of Colorado, have invented certain new and useful Improvements in Cutter-Bars, of which the following is a specification.

My invention appertains to cutting apparatus for harvesters, mowers and like machines for cutting grain, grass and like growth whether in drills or broadcast, the improvement relating most especially to the type of cutting mechanism embodying an endless or chain cutter.

The invention consists primarily of a reversible ledger plate, novel fastening means for attaching the ledger plate to the cutter bar, and peculiar mountings for the endless cutter.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of a cutting apparatus embodying the invention, parts being broken away and parts being omitted. Fig. 2 is a transverse section on the line 2—2 of Fig. 1 showing the parts on a larger scale. Fig. 3 is a detail perspective view of a cutter section of the chain cutter. Fig. 4 is a top plan view of an end portion of the ledger plate showing a portion of the grain shoe provided with a set screw for adjusting the ledger plate to take up the wear.

Corresponding and like parts are referred to in the following description and indicated in all the views of the drawings by the same reference characters.

The cutter bar comprises a strip 1 and upper and lower plates 2 and 3, the same being connected by suitable fastenings 4. Guard fingers 5 are secured to the cutter bar preferably by means of the same fastenings 4. The vertical extensions 6 near the tapered extremities of the guard fingers have cuts 7 extended inward from their rear edges to receive the front edge of the ledger plate. Projections 8 attached to the plate 2 have cuts 9 extended inward from their upward edges to receive the rear edge of the ledger plate. Race-ways 10 and 11 are provided in the front and in the rear of the strip 1 and receive the links connecting the cutter sections of the endless or chain cutter. The ledger plate 12 is reversible and is formed in opposite edges with notches 13. One edge of each notch is perpendicular to the longitudinal axis of the plate as shown at 14, whereas the opposite edge 15 is inclined to said axis and beveled to a knife edge. The notches 13 in opposite edges of the ledger plate aline transversely and are separated by opposite projecting portions 19 which enter the cuts 7 and 9 of the guard fingers 5 and projections 8. When it is required to reverse the ledger plate, the same is moved longitudinally a distance to cause said projecting portions 19 to clear the cuts 7 and 9, after which the ledger plate is lifted from the cutter bar and turned end for end and replaced upon the cutter bar and moved longitudinally to cause corresponding portions 19 to enter the said cuts 7 and 9. The cutter sections of the endless or chain cutter operate against the inclined cutting edges 15 of the ledger plate. The edges of the notches in opposite edges of the ledger plate are reversely arranged, i. e., inclined edges of the notches at one edge of the ledger plate are opposite the straight edges 14 of the corresponding edges in the opposite edges of the ledger plate. It will thus be understood that when one set of edges become dull, the ledger plate may be reversed so as to bring a sharp set of cutting edges into position for operation. To compensate for wear incident to sharpening the cutting edges of the ledger plate, a set screw 16 is threaded into a lug 17 projected from the grain shoe 18, said set screw being arranged to engage the inner end of the ledger plate to move the same outward and hold it in adjusted position.

The projecting portions 19 at opposite edges of the ledger plate intermediate of the notches 13 are adapted to have their ends engage the cuts 7 and 9 of respectively the extensions 6 and the projections 8, thereby retaining the ledger plate in position and holding it against vertical displacement at intervals throughout its length. The cutter bar is provided at its outer end with a circumferentially grooved idler 20 and at its inner end with a toothed driver 21 which is adapted to have rotary movement imparted thereto in the usual manner. The endless or chain cutter comprises cutter sections 22 and links 23. Each cutter section embodies two cutter teeth and the inner or rear edge thereof is provided with a notch 24 having one edge straight or abrupt and the other edge inclined to correspond with the shape of the driver 21 as indicated most clearly in Fig. 1. The cutter sections travel beneath the ledger plate and over raised portions 25 of the guard fingers in the rear of the vertical extensions 6 thereof and forward of the front race 10. The links and cutter sections have a limited play and by having the cutting edges 15 of the ledger plate beveled upon the upper side, the cutter sections 22 are drawn upward against the lower side of the ledger plate in the operation of the cutting apparatus. The lower plate 3 is provided at its front edge with a vertical flange 26 and at its rear edge with a vertical flange 27, said vertical flanges 26 and 27 being located some distance from respectively the front and rear edges of the strip 1 to form the races 10 and 11. The upper plate 2 has a pendent flange 28 at its front edge which overlaps the front edge of the strip 1 and reinforces the same and sustains the wear of the front run of the chain cutter. The rear edge portion of the plate 2 projects in the rear of the strip 1 and extends over the race 11 to close the same and extends in the rear of said race to form a guard 29 and is recurved as shown at 30 to form a housing to inclose the rear portion of the chain cutter.

Having thus described the invention, what is claimed as new is:

1. In cutting apparatus for harvesters, mowers and the like, the combination of a cutter bar having spaced front and rear extensions or projecting parts having horizontal cuts in their opposing vertical faces, and a reversible ledger plate having opposing projections to enter the aforesaid horizontal cuts by means of which the ledger plate is held in place in either adjusted position.

2. In cutting apparatus for harvesters, mowers and the like, a cutter bar comprising a strip and guard fingers, the latter having vertical extensions near their front ends and having cuts extended forwardly from their rear edges, projections extended upward from the strip and having cuts extended rearward from the edges facing the said vertical extensions of the guard fingers, and a reversible ledger plate having corresponding notches in opposite edges to provide spaced projections which are adapted to enter the forwardly extended cuts of the said extensions of the guard fingers and the rearwardly extending cuts of the projections of the aforementioned strip to retain the ledger plate in place in either adjusted position.

3. In cutting apparatus for harvesters, mowers and the like, the combination of a bar, guard fingers secured to the bar and projecting forward therefrom and having upwardly projecting extensions at their outer ends, said extensions having forwardly extended cuts in their rear walls, projections extended upwardly from said bar and having rearwardly extended cuts in their front walls, said projections corresponding approximately in number and position with the guard fingers, and a ledger plate having corresponding projecting portions at opposite edges to enter the opposite respective forwardly extended and rearwardly extended cuts.

4. In cutting apparatus for harvesters, mowers and the like, the combination of a bar, guard fingers projected forward from said bar and having upwardly projecting extensions at their outer ends having forwardly extended cuts, projections extended upwardly from the said bar and corresponding in position and number with the guard fingers and having rearwardly extended cuts in their front walls, and a ledger plate having registering notches in opposite edges to provide cutters, and having the portions between the notches or cutters corresponding with the aforesaid upwardly extending projections and adapted to enter the respective forwardly extended and rearwardly extended cuts thereof.

5. In cutting apparatus for harvesters, mowers and the like, the combination of a strip, a plate attached to the lower side of said strip and projected beyond the front and rear edges thereof and having upwardly extended flanges to form front and rear races, a second plate secured to the upper side of the strip and having a pendent flange at its forward edge overlapping the front edge of said strip and having its rear portion extended over the rear race to form a housing and an endless or chain cutter encircling the said strip and having portions adapted to operate in the front and rear races.

6. In cutting apparatus for harvesters, mowers and the like, the combination of a strip, a plate attached to the lower side of said strip and projected beyond the front and rear edges thereof and having upwardly extended flanges to form front and rear races, a second plate secured to the upper side of the strip and having a pendent flange at its forward edge overlapping the front edge of said strip and having its rear portion extended over the rear race to form a housing and having its rear portion rebent to inclose a space in the rear of said strip and an endless or chain cutter encircling the said strip and having portions adapted to operate in the front and rear races.

In testimony whereof I affix my signature in presence of two witnesses.

ELI J. WOLFROM. [L. S.]

Witnesses:
V. B. HILLYARD,
W. N. WOODSON.